United States Patent [19]

Uchi et al.

[11] 4,369,198

[45] Jan. 18, 1983

[54] METHOD FOR EXTRACTING INGREDIENTS OF OIL-CONTAINING SEEDS

[75] Inventors: Osamu Uchi, Fujisawa; Chiaki Hatanaka, Tokyo, both of Japan

[73] Assignee: Mitsubishi Chemical Industries Limited, Tokyo, Japan

[21] Appl. No.: 933,847

[22] Filed: Aug. 15, 1978

Related U.S. Application Data

[63] Continuation of Ser. No. 747,032, Dec. 2, 1976, abandoned.

[51] Int. Cl.³ ............................................... A23J 1/14
[52] U.S. Cl. .................................... 426/271; 426/431; 426/482; 426/488; 426/495; 426/518; 426/521; 426/598; 426/656
[58] Field of Search ............... 426/271, 436, 431, 489, 426/521, 488, 598, 634, 482, 518, 615, 495, 656; 260/123.5

[56] References Cited

U.S. PATENT DOCUMENTS

| 2,451,659 | 10/1948 | Calvert | 260/123.5 |
| 3,168,406 | 2/1965 | Moshy | 260/123.5 |
| 3,288,614 | 11/1966 | Miles | 426/598 |
| 3,660,111 | 5/1972 | Kock | 426/634 |
| 3,669,677 | 6/1972 | Sair et al. | 426/431 |
| 3,809,771 | 5/1974 | Mustakas | 426/598 |
| 4,012,531 | 3/1977 | Viani | 426/431 |

OTHER PUBLICATIONS

Wilkens et al., Food Technology, vol. 21, 12/67, pp. 1630-1633.
Abstract of South African patent application 65/0987.

*Primary Examiner*—William F. Smith
*Attorney, Agent, or Firm*—Oblon, Fisher, Spivak, McClelland & Maier

[57] ABSTRACT

A method for extracting ingredients of oil-containing seeds comprising triturating uncrushed seeds, which have not been soaked in water, in deoxygenated hot water of from 70° C. to the boiling point under the anaerobic condition is disclosed. By this method, the ingredients of oil-containing seeds can be extracted with higher extraction rate, lower viscosity, lower peroxide value and reduced odor.

23 Claims, No Drawings

METHOD FOR EXTRACTING INGREDIENTS OF OIL-CONTAINING SEEDS

This is a continuation of application Ser. No. 747,032, filed Dec. 2, 1976, abandoned.

BACKGROUND OF THE INVENTION

This invention relates to a method for extracting ingredients of oil-containing seeds. More particularly, this invention relates to a method of treating oil-containing seeds for extraction of cell substances, especially protein, of oil-containing seeds under the condition in which enzymes, especially oxidizing enzymes, are deactivated by heating characterized by triturating oil-containing seeds which have not been soaked in water, in deoxygenated hot water or deoxygenated hot water containing metal ion chelating agents, etc. under the anaerobic condition.

An object of this invention is to provide a method of treating oil-containing seeds whereby an aqueous dispersion of cell substances of the oil-containing seeds (hereinafter called "milk" in contrast with the term "residue" or "cake") is obtained with higher protein content, reduces viscosity and diminished unpleasant odor (inclusive of bean smelling and grassy smelling).

A further object of this invention is to provide a method of treating oil-containing seeds for extracting cell substances thereof which is simple in operation and economically advantageous.

Various methods have hitherto been proposed to obtain seed milk with reduced unpleasant odor (bean smelling and/or grassy smelling) at high extraction rate from oil-containing seeds. One of those methods substantially comprises soaking oil-containing seeds (or microorganisms) in an aqueous solution containing a metal ion chelating agent and/or a reducing agent for saturation, thereafter heating to 70° C. or higher, and triturating the seeds (or microorganisms) for extraction. Although this method is very excellent, it is still disadvantageous in that grassy smelling is, although slightly, produced by the action of lypoxydase, a long soaking time is required and thus a large scale facilities are necessary when the soaking is continuously carried out, and a large amount of waste water must be treated. As an improvement of this method, a method comprising directly triturating uncrushed seeds soybeans for instance, which have not been soaked in water, in hot water in the presence of oxygen under the aerobic condition in order to deactivate oxidizing enzymes. However, in this method, extraction of protein is only 63% as seen in the comparative data shown hereinafter, and extraction of the bean milk is at low level.

It is already known that the percentage of protein extraction is increased by treating soaked and triturated soybeans or pulverized defatted soybeans with an alkali solution at room temperature. But a method in which uncrushed soybeans which have not been soaked in water for saturation is directly triturated in hot diluted alkali solution so as to obtain bean milk containing coagulative protein, which can be used as the raw material for production of bean curd, is not yet known.

We have made an extensive study in search of a method in which the above-mentioned disadvantages are eliminated. And we have found that: When oil-containing seeds, which have not been soaked in water, are triturated under the anaerobic condition, protein is extracted at higher extraction rate, and bean milk the peroxide value (POV) of which is very low is obtained; and when the trituration is carried out with hot aqueous solution containing a metal ion chelating agent, etc. under the anaerobic condition, bean milk the POV and viscosity of which are further lower is obtained, and thus the extraction rate of protein is further increased. This invention is based on this finding of ours.

SUMMARY OF THE INVENTION

The gist of this invention resides in the treatment of oil-containing seeds which comprises triturating oil-containing seeds under anaerobic conditions in a hot aqueous solution of a temperature not lower than 70° C. and not higher than the boiling point thereof, which may, if desired, contain a metal ion chelating agent, cysteine, one or more of sodium hydroxide, potassium hydroxide and ammonium hydroxide or calcium hydroxide, and thus extracting cell substances of said seeds.

The method of this invention can be applied to beans and peas such as soybean, peanut (ground nut, monkey nut); seeds containing unsaturated fatty acids and oxidizing enzymes such as cotton seed, rape seed, sesame, safflower seed, etc.; and cotyledons of these seeds the skin of which has been carefully removed so as to keep the cotyledon intact; and further to defatted seeds such as defatted soybeans.

DETAILED DESCRIPTION OF THE INVENTION

According to this invention, the treatment of the above-mentioned seeds is carried out under the anaerobic condition. That is to say, trituration and extraction of seeds is conducted by using deoxygenated water, that is, water free from oxygen in the oxygen-free atmosphere.

The above-mentioned deoxygenated water that is, water substantially free from oxygen includes (1) fresh boiled water, (2) water through which nitrogen, hydrogen, argon, carbon dioxide, carbon monoxide, etc. has been bubbled, (3) water containing a reducing agent such as sulfurous acid, ascorbic acid, erythorbic acid, etc. When the reducing agent is used, the proper concentration is 0.5–160 ppm for sulfurous acid, 50–1000 ppm for ascorbic acid and erythorbic acid. Deionized water or distilled water is preferably used for preparing deoxygenated water.

The method for removing oxygen from the operation atmosphere during trituration and extraction, includes:

(1) To bubble the extraction liquid with an inert gas such as nitrogen during trituration and extraction treatment;

(2) To carry out the trituration and extraction in an tightly closed vessel out of which oxygen has been removed by one of the above-mentioned procedures; etc.

It is required to use hot deoxygenated water or hot solution of a temperature not lower than 70° C. in order to prevent generation of bean smelling, but the water or solution should not be higher than the boiling point thereof in order to extract protein at high extraction rate. In consideration of shorter time for deactivating enzymes, the practically preferred temperature range is 75° C.—the boiling point. It is not necessary to keep the temperature constant during the trituration and extraction, but the temperature can be varied within the above-mentioned temperature range.

The time required for trituration and extraction is usually several seconds to about 60 minutes, and varies depending upon the temperature, and also depends upon whether the treatment is carried out by the batch operation or the continuous operation. In the case of the batch operation, the adequate treating time is 25–60 minutes at 70° C., 5–30 minutes at 80° C., and 3–20 minutes at 97° C. When the trituration and extraction are carried out continuously, extraction is effected within several seconds to several minutes.

If the above-mentioned hot extraction water contains a metal ion chelating agent, cysteine, or alkali, percentage of protein extraction is increased.

The metal ion chelating agents usable in this invention include polyphosphoric acid, phytic acid, citric acid, or potassium salt, sodium salt, ammonium salt of these acids. The amount of the used chelating agent is preferably 0.02%–1.5% by weight of the weight of the seeds to be treated. More than 1% of the chelating agent can, of course, be used, but it is not desirable from the economic viewpoint. When phytic acid is used, it is desirable to use in an amount 0.02%–0.5% by weight of the seeds. As for cysteine, use of 0.2%–2% by weight of the seeds, is desirable.

Examples of the alkalis to be used are calcium hydroxide, etc. It is desirable to use calcium hydroxide from the viewpoint of improving the taste and flavor of the milk. But calcium reacts with a chelating agent to form a chelate compound, and therefore the combined use of calcium hydroxide and a metal ion chelating agent should be avoided. The amount of the alkali to be used is 0.01–0.07 gram equivalent per 1 kg of oil-containing seeds to be treated. However, when trituration-extraction is carried out with 0.05 gram equivalent or more of potassium hydroxide or sodium hydroxide per 1 kg of seeds at temperature not lower than 90° C. for not less than 10 minutes, unpleasant odor may be generated, therefore, the treatment must be carefully carried out.

Usually the hot water is used at least in an amount 4 times the amount of the seeds to be treated. Although the yield of the solid ingredients of the milk increases as the amount of used hot water increases, the practically adequate amount is 6–25 times the amount of the seeds.

Trituration of seeds can be effected by way of pressing, pounding, shearing, grinding, or any combination of these, and apparatuses such as chopper-mill, quern-type mill, sand-grinder, roll-mill, impact cell mill, etc. can be used. The trituration apparatuses can be continuously connected in series in 2 steps or 3 steps in accordance with the requirement. It is desirable to use a quern type colloid mill at the last step. This improves taste and flavor of the obtained bean milk.

In order to completely deactivate undesirable biochemically active substances such as oxidizing enzymes, trypsin inhibitor, etc. a tank with temperature-maintaining device or holding tubes should be used for the purpose of maintaining high temperature. Deactivation can be usually effected heating at 70° C. to the boiling point for several minutes to 60 minutes, but it can be effected at 100°–190° C. in several seconds to several minutes by using a pressure vessel in which the extraction liquid is kept in the liquid state. If the heating is effected after the protein substances have been dispersed in the extraction liquid, it does not adversely affect the extraction even if a temperature is employed that is higher than the boiling point at normal pressure. The deactivation procedure can be carried out immediately after the trituration-extraction, after the separation of milk and evaporation concentration thereof, or even at the last step, in which case the procedure simultaneously has the effect of sterilization.

Separation of the trituration residue from the slurry obtained by the trituration-extraction can be effected by means of any known separation apparatus such as centrifugal precipitator, centrifugal dryer, vacuum filter, screen filter, press dryer, etc.

The cake remaining after separation of milk from the trituration slurry still contains a considerable amount of bean milk, which is recovered by sprinkling water over the cake in the centrifugal separator, or dispersing it again in water and separating the milk-containing water.

The water to be used for washing of the cake should preferably be hot water in the anaerobic state. The recovered milk-containing water can be added to the bean milk after concentration, or can be added to the deoxygenated water used for trituration-extraction of seeds after preheating, or can be used as the trituration-extraction medium per se.

The thus obtained milk can be vacuum-concentrated or can be deodorized by means of an operation such as flashing.

The milk is then sterilized by means of a conventional method such as flash sterilization. Indirect heating sterilization using a plate type heat exchanger or flash heating sterilization by directly blowing superheated steam into the milk is preferred, although various other methods can be employed. The sterilized milk is cooled preferably by the vacuum flash method, since this simultaneously effects deodorization, too.

The thus obtained milk is supplied for drinking or for further processing as is or blended with any other ingredients. When blended, addition of the other ingredients or additives may be carried out prior to sterilization or at any stage. Of course, the sterilized milk can be made into powdered milk by the conventional process such as spray drying directly or after being concentrated by any conventional process.

If the high pressure homogenizing treatment at the pressure of 100–500 kg/cm$^2$ G (gauge) is applied to the milk at an appropriate stage of the above-mentioned process, this will contribute to more effective deactivation of enzymes, improvement of deodorization effect, improvement of separation of the milk from the cake, prevention of excessive denaturation and stabilization of protein, better dispersion of colloidal particles of fat and additives stabilizing the emulsion, improvement of taste and suaveness of the milk, etc.

All of the above-mentioned steps and intermediate storage and transportation of the milk, etc. should preferably be carried out under anaerobic conditions maintained by an inert gas such as nitrogen and at a temperature not less than 50° C. in order to prevent oxidation of unsaturated fatty acids, etc., generation of grassy smelling, etc.

According to this invention, generation of malodors by the action of oxidizing enzymes is prevented, rate of protein extraction is enhanced in comparison with the conventional extraction methods, milk with lower POV and viscosity is obtained, deodorization is easily effected by a simple means such as vacuum concentration by flashing because of low POV and, separation of milk and cake is made easier because of the low viscosity and thus a thicker milk with higher solid ingredient concentration can be obtained. Also, in the method of this invention, the step of soaking for swelling is not included, and thus the environmental pollution with the waste water is avoided.

Now the invention is specifically explained by way of working examples, But the invention is not limited to these examples but only limited by the gist as defined in the attached claims.

EXAMPLE 1

In a jacketed Waring blender kept at 80° C., 700 ml of hot water of 80° C. was introduced, nitrogen gas was blown into it for deoxygenation, 45 g of uncrushed soybeans were added, and trituration-extraction was carried out for 25 minutes, as nitrogen bubbling was continued. Thereafter, the produced milk was separated by a centrifugal separator, and the residual cake was washed with water twice. The washing water was added to the milk. The results are shown in Table 1.

EXAMPLE 2

In a dry box the inside atmosphere of which had been replaced with nitrogen, a jacketed Waring blender was placed. Into this blender, 700 ml of fresh boiled water and 45 g of uncrushed soybeans were introduced and the blender was tightly closed. Then the blender was taken out of the box and trituration-extraction was carried out for 25 minutes at 80° C. Thereafter the produced milk was separated from the residual cake by a centrifugal separator. The cake was washed with water twice and the water was combined with the milk. The test results are shown in Table 1.

EXAMPLE 3

In a jacketed Waring blender kept at 80° C., 700 ml of fresh boiled water was introduced, and the additive indicated in Table 1 was dissolved therein by agitation as nitrogen gas being blown in, and simultaneously 45 g of uncrushed soybeans were placed in the blender. And thus trituration-extraction was carried out for 25 minutes. The milk was separated by centrifuge and the cake was washed with water twice and the water was combined with the milk. The test results are shown in Table 1.

EXAMPLE 4

In a jacketed Waring blender kept at 80° C., 200 ml of fresh boiled water was placed, and 45 g of uncrushed soybeans and 0.02 g of sodium polyphosphate (0.045% by weight of the soybeans) were added and triturated for 5 minutes as nitrogen being blown in. Then 500 ml of deoxygenated water of 80° C. was added and trituration-extraction was further continued for 22 minutes. Thereafter, the procedure of Example 2 was followed. The test results are shown in Table 1.

EXAMPLE 5

In a dry box the inside atmosphere of which had been replaced with nitrogen, 700 ml of fresh boiled water, 45 g of uncrushed soybeans and 0.2 g of sodium polyphosphate (0.45% by weight of the soybeans) were placed in a jacketed Waring blender and the blender was tightly closed. The blender was taken out of the box and trituration-extraction was carried out for 25 minutes at 80° C. Thereafter, the procedure of Example 3 was followed. The test results are shown in Table 1.

COMPARATIVE EXAMPLE 1

In a jacketed Waring blender, 700 ml of hot water of 80° C. which had not been deoxygenated was placed and the blender was kept at 80° C. Forty-five (45) grams of uncrushed soybeans were introduced into the blender and trituration-extraction was carried out for 25 minutes in the presence of air. Thereafter, the milk was separated and the cake was washed with water twice and the water was added to the milk. The test results are shown in Table 1.

COMPARATIVE EXAMPLE 2

In a jacketed Waring blender, 700 ml of hot water of 80° C. which had not been deoxygenated, 45 g of uncrushed soybeans and 0.14 g of sodium polyphosphate were placed. Trituration-extraction was carried out in the same way as in Comparative Example 1, and bean milk was obtained. The test results are shown in Table 1.

COMPARATIVE EXAMPLE 3

Bean milk was obtained in the same way as in Comparative Example 2 except that deoxygenated hot water of 80° C. was used. The test results are shown in Table 1.

TABLE 1

| Example No. | Additive | Amount of additive % based on weight of soybeans | Condition with respect to oxygen | Yield of solid ingredients in milk | percentage of protein extracted | Ostwald viscosity (1) | POV (2) |
|---|---|---|---|---|---|---|---|
| Ex. 1 | None | — | Anaerobic | 64.1 | 76.2 | 1.09 | 0.025 |
| Ex. 2 | None | — | Anaerobic | 62.3 | 74.6 | 1.14 | 0.032 |
| Ex. 3 | Sodium polyphosphate | 1.5 | Anaerobic | 30.6 | 90.6 | 1.06 | 0.020 |
|  |  | 1.0 | " | 70.2 | 91.1 | 1.05 | 0.021 |
|  |  | 1.5 | " | 71.4 | 92.4 | 1.05 | 0.020 |
|  |  | 0.3 | " | 71.2 | 94.1 | 1.05 | 0.021 |
|  | Sodium citrate | 1.0 | Anaerobic | 74.2 | 93.2 | 1.08 | 0.025 |
|  |  | 0.5 | " | 70.8 | 91.3 | 1.09 | 0.023 |
| Ex. 4 | Sodium polyphosphate | 0.045 | Anaerobic | 67.3 | 87.9 | 1.08 | 0.025 |
| Ex. 5 | Sodium polyphosphate | 0.45 | Anaerobic | 72.6 | 93.4 | 1.06 | 0.020 |
| Comparative Ex. 1 | None | — | Aerobic | 52.7 | 62.6 | 1.36 | 0.092 |
| Comparative | Sodium poly- | 0.3 | Aerobic | 64.9 | 80.2 | 1.32 | 0.086 |

TABLE 1-continued

| Example No. | Additive | Amount of additive % based on weight of soybeans | Condition with respect to oxygen | Yield of solid ingredients in milk | percentage of protein extracted | Ostwald viscosity (1) | POV (2) |
| --- | --- | --- | --- | --- | --- | --- | --- |
| Ex.2 Comparative Ex. 3 | phosphate Sodium polyphosphate | 0.3 | Aerobic | 65.4 | 82.4 | 1.21 | 0.073 |

(1) Viscosity of milk containing 2.9% of solid ingredients at 35° C.
(2) Light absorbance at 480 mμm of milk containing 2% of solid ingredients by iron rhodanide method.

Table 1 shows the results when the treatment was carried out under the anaerobic condition using a chelating agent and the results when the treatment was carried out under anaerobic condition but no chemicals were added.

When no chemical was added, as evidenced by comparison of the results of Examples 1 and 2 and Comparative Example 1, by employment of the anaerobic condition, yield of solid ingredients of milk and protein extraction are increased respectively by 18% and by 21%; and viscosity and POV were decreased respectively by 16% and by 65% (in terms of the values of Comparative Example 1 as 100%).

When a chelating agent was added, as evidenced by comparison of the results of Example 3, 4 and 5 and Comparative Examples 2 and 3, by employment of the anaerobic condition, yield of solid ingredients in milk and protein extraction were increased respectively by 4–19% and by 9–17%; and viscosity and POV were decreased respectively by 17–20% and by 64–77%.

In Comparative Example 3, although deoxygenated water was used, trituration-extraction was carried out under the aerobic condition. Therefore, the object intended in this invention was not satisfactorily achieved. It will be understood that it is important to remove oxygen from the atmosphere of the treatment during the trituration-extraction.

TABLE 2

| Additive | Amount of additive, % based on weight of soybeans | Yield of solid ingredients in milk (%) | percentage of protein extracted | Ostwald viscosity | POV |
| --- | --- | --- | --- | --- | --- |
| Sodium hydroxide | 0.075 | 76.3 | 96.8 | 1.12 | 0.035 |
|  | 0.05 | 72.8 | 94.2 | 1.10 | 0.025 |
|  | 0.01 | 71.0 | 91.3 | 1.09 | 0.032 |
| Potassium hydroxide | 0.05 | 73.6 | 95.3 | 1.11 | 0.032 |
| Calcium hydroxide | 0.05 | 71.3 | 89.6 | 1.05 | 0.030 |

EXAMPLE 7

In a jacketed Waring blender, 2100 ml of hot water which had been boiled and cooled to the temperatures indicated in Table 3 was introduced, and 0.4 g of sodium polyphosphate was dissolved therein by agitation as the temperature being maintained and nitrogen gas being blown in. The 135 g of uncrushed soybeans were placed in the blender and trituration-extraction was carried out for a period of time respectively indicated in Table 3 and 4. The milk was separated by centrifuge and the cake was washed with water once. The washing water was combined with the milk. The test results are shown in Table 3 and 4.

TABLE 3

| Heating time (min) | | | | | 25 | | | | |
| --- | --- | --- | --- | --- | --- | --- | --- | --- | --- |
| Heating temp. (°C.) | 60 | 65 | 70 | 75 | 80 | 85 | 90 | 95 | 97 |
| Protein extraction (%) | 86 | 91 | 79 | 83 | 93.4 | 87 | 83 | 81 | 79 |
| Yield of solids in milk % | 59 | 64 | 66 | 65 | 72 | 68 | 65 | 66 | 63 |
| POV | 0.215 | 0.090 | 0.045 | 0.028 | 0.020 | 0.025 | 0.027 | 0.035 | 0.038 |

TABLE 4

| Heating temp. (°C.) | 97 | | 70 | | | | Triturated at 97° C. for 5 min & agitated at 80° C. for 5 min. |
| --- | --- | --- | --- | --- | --- | --- | --- |
| Heating time (min) | 3 | 5 | 10 | 20 | 40 | 60 | |
| POV | 0.038 | 0.032 | 0.033 | 0.056 | 0.046 | 0.035 | 0.025 |

EXAMPLE 6

In a jacketed Waring blender, 700 ml of hot water of 80° C. which had been boiled and cooled to 80° C. was placed, and an alkali indicated in Table 2 was dissolved therein by agitation as the temperature being kept at 80° C. and nitrogen bubbling being continued. Then 45 g of uncrushed soybeans were introduced therein, and trituration-extraction was carried out for 20 minutes. The milk was separated by centrifuge, the cake was washed with water twice and the milk and the washing water were combined. The test results are shown in Table 2.

EXAMPLE 8

In a jacketed Waring blender, 700 ml of hot water which had been boiled and cooled to 75° C. was introduced, and the blender was kept at that temperature. After 45 g of uncrushed soybeans were placed in the blender, immediately nitrogen was blown in and trituration was started. In one minute, the temperature was stabilized at 75° C. After the beans were triturated for 5 minutes at 75° C., the temperature of the jacket was raised to 80° C., and the trituration was continued further for 10 minutes. Then the milk wwas separated. The rate of protein extraction was 88.3%, POV was 0.015, viscosity was 1.08. This milk and the milk obtained in Comparative Example 1 and the milk obtained in Example 2 were respectively vacuum-concentrated. With respect to these concentrated milks, an organoleptic appraisal was conducted for their odor by 15 well-trained panel members. With respect to intensity of odor, an order of odor intensity, the product of Example 8 < the product of Example 2 < the product of Comparative Example 1, was obtained with the probability of 99%. All the fifteen members reported that the product of Comparative Example 1 had been smelling, six members reported that they felt bean milk odor from the product of Comparative Example 2.

EXAMPLE 9

In a jacketed Waring blender, 500 ml of hot water of 80° C., 30 g of uncrushed soybeans, 0.15 g of sodium salt of ascorbic acid were placed, and the blender was tightly closed. Trituration-extraction was carried out as the temperature was kept at 80° C., and the results were as follows. Rate of protein extraction was 84.2%, POV was 0.017, and the amount of the obtained milk was 30 ml. This example shows that use of a reducing agent such as ascorbic acid in a closed air-tight vessel is effective for creating anaerobic conditions.

EXAMPLE 10

In a jacketed Waring blender, 500 ml of hot water of 80° C., 30 g of uncrushed soybeans, 0.15 g of sodium salt of ascorbic acid and 0.5 g of cysteine were placed. Trituration-extraction was carried out in the same way as in Example 9, and 380 ml of bean milk was obtained. Rate of protein extraction was 83.6%, POV was 0.018 and the viscosity was 1.06. This example shows that coexistence of cysteine improves percentage of protein extraction. Also it was exhibited that when this milk was concentrated, its solid ingredient content was raised to about 25%.

EXAMPLE 11

Uncrushed soybeans which contained 8% water and had been kept at 80° C. was crushed by means of a pair of rollers, which were heated at 60°-90° C. and rotated at 30 r.p.m. with the clearance of 3 mm. The skin of the beans was separated from the germ-and-cotyledon part by air elutriation and the latter was dried and pulverized to 10-20 mesh powder. Three (3) kg of the powder was mixed with 30 l of a hot 0.0172% aqueous solution of caustic soda which had been boiled, and triturated with a quern type mill. The thus obtained slurry was separated in a closed air-tight centrifugal separator into milk and cake. The milk was heated at 90° C. for 10 minutes. The cake was immediately triturated again in hot water of 80° C. and extracted for 20 minutes, and milk was further separated by centrifuge. The total amount of the obtained milk was 87%. The milk was free from grassy smelling and unpleasant odor caused by alkali.

When a quern type mill, sand grinder, etc. are used, uncrushed beans or coarsely crushed beans (for instance, divided into two) are not easily fed into the grinding position. Therefore, it is desirable to grind beans into particles of 10 mesh or so and quickly triturate them in hot water, whereby efficiency of trituration and quality of the product are improved.

EXAMPLE 12

Two jacketed colloid mills were kept at 80° C. and were connected in series. As nitrogen gas was passed through these mills at the rate of 10 l/min, skinless soybeans (yield of the skinless beans was 87%) were fed into the first mill at the rate of 9 kg/hr, and simultaneously with the skinless beans, hot water of 85° C. containing 0.25% based on the weight of the soybeans of sodium polyphosphate, which had been deoxygenated by boiling, was supplied at the rate of 80 kg/hr. The slurry discharged from the second colloid mill was continuously introduced into a centrifugal precipitator with horizontal axis, wherein bean milk was separated. The milk was temporarily stored in a jacketed tank (20 l capacity) kept at 70° C. The milk was then sterilized with a sterilizing apparatus indirectly heated with a plate type heat exchanger, and was flashed into vacuum for deodorization. The yield of the solid ingredients of this milk (hereinafter called Sample 1) based on the weight of the skinless seeds was 65%.

COMPARATIVE EXAMPLE 4

For the purpose of comparison, a slurry, which was prepared in the same way as in Example 12, was cooled to 32° C. by the plate type heat exchanger. Thereafter the slurry was transferred to the centrifugal precipitator kept at room temperature and the cake was separated. The obtained milk was temporarily stored in a 20 l storage tank at room temperature, and thereafter it was subjected to the sterilization and deodorization treatments as explained in Example 12. The yield of the solid ingredients of this milk (hereinafter called Sample 2) based on the weight of the skinless seeds was 64%.

After Sample 1 and 2 were stored at 2° C. for 3 days, organoleptic appraisal was conducted for the odor of these samples by 10 panel members. The whole members reported that Sample 2 had strong grassy smelling and strong bean smelling while Sample 1 had weak grassy smelling and weak bean smelling.

EXAMPLE 13

The slurry obtained continuously in the same way as in Example 12 was introduced into a jacketed storage tank kept at 85° C. and thus heated with the average residence time of 20 minutes. Thereafter, the slurry was transferred to a centrifugal precipitator with horizontal axis kept at 80° C., whereby the milk was separated. The thus obtained milk was stored in a 200 l jacketed tank kept at 65° C. After the average residence time of 2 hours, the milk was transferred to a sterilizing apparatus indirectly heated with a plate type heat exchanger. The milk was sterilized at 125° C. for 30 seconds, and was flashed into vacuum for deodorization. The yield of the solid ingredients of this milk (hereinafter called Sample 3) was 67%.

COMPARATIVE EXAMPLE 5

For the purpose of comparison, skinless soybeans were triturated and the residue (cake) was removed in the same way as in Example 13 and bean milk was obtained. The thus obtained milk was stored in a 200 l tank which was not intentionally heated and was cooled to 30° C. after average residence time of 2 hours. The milk was sterilized and deodorized in the same way as in Example 13. The yield of the solid ingredients of this milk (hereinafrter called Sample 4) was 66%.

After Sample 3 and 4 were stored at 2° C. for 3 days, organoleptic appraisal was conducted by the 10 panel members. Eight (8) members reported that Sample 4 had strong grassy smelling, paint-like unpleasant odor and weak putrid odor, while Sample 3 had only weak bean smelling.

EXAMPLE 14

Two (2) jacketed colloid mills kept at 85° C. were connected in series. As nitrogen gas was being blown in at the rate of 10 l/min, skinless soybeans (93% yield) was introduced into the first mill at the rate of 9 kg/hr, and at the same time hot water of 85° C. containing 0.025% by weight of sodium polyphosphate, which had been deoxygenated by boiling until the concentration of the dissolved oxygen was lowered to 1 ppm or less, was continuously introduced at the rate of 80 kg/hr. Thus trituration was conducted with the two colloid mills. The slurry discharged from the second mill was continuously transferred to a centrifugal precipitator with horizontal axis, which was kept at 80° C. and into which nitrogen was introduced at the rate of 1 l/min. In this precipitator, the residue was separated and bean milk was obtained. The obtained milk was temporarily stored in a 20 l tank and then sterilized in a sterilizing apparatus indirectly heated by a plate type heat exchanger at 125° C. for 30 seconds. Thereafter, the milk was flashed into vacuum for deodorization. The yield of the solid ingredients of this milk (hereinafter called Sample 5) based on the weight of the skinless seeds was 65%.

COMPARATIVE EXAMPLE 6

For the purpose of comparison, bean milk was obtained in the same way as in Example 14 except that nitrogen was not introduced into the apparatuses. (This milk is hereinafter called Sample 6.)

After Sample 5 and 6 were stored at 2° C. for 3 days, organoleptic appraisal was conducted by the 10 panel members. Nine (9) members reported that Sample 6 had strong bean smelling and Sample 5 had weak bean smelling.

EXAMPLE 15

A slurry continuously obtained in the same way as in Example 14 was transferred to a jacketed storage tank which was kept at 85° C. and in which nitrogen gas was introduced at the rate of 2 l/min. The milk was heated therein with average residence time of 20 minutes, and thereafter, it was continuously introduced into a centrifugal precipitator with horizontal axis, wherein the residue was separated. To thus obtained milk was transferred to 200 l tank in which nitrogen gas was introduced at the rate of 10 l/min, and after an average residence time of 2 hours, the milk was sterilized in a sterilizing apparatus indirectly heated with a plate type heat exchanger at 125° C. for 30 minutes, and it was flashed into vacuum for deodorization. The yield of the solid ingredients of this milk (hereinafter called Sample 7) based on the weight of the skinless seeds was 67%.

COMPARATIVE EXAMPLE 7

For the purpose of comparison, in the same way as in Example 16, skinless soybeans were triturated and heat-treated. And bean milk was obtained by separating the residue, storing the separated liquid, sterilizing and deodorizing it in the same way as in the same way as in Example 15 except that introduction of nitrogen gas was not employed. (The thus obtained bean milk is hereinafter called Sample 8.)

After Sample 7 and 8 were stored at 2° C. for 3 days, organoleptic appraisal was conducted for the odor of these samples by the 10 panel members. The whole members reported that Sample 8 had strong grassy smelling, paint-like unpleasant odor and bean smelling, while Sample 7 had only weak bean smelling.

EXAMPLE 16

Two jacketed colloid mills were connected in series, and into the first mill were simultaneously and continuously introduced hot water of 85° C., which had been deoxygenated by boiling, at the rate of 80 kg/hr, an aqueous solution containing 21 g of sodium polyphosphate and 60 g of common salt (Na Cl) at the rate of 700 ml/hr and skinless soybeans (87% yield) at the rate of 9 kg/hr. Into the bean slurry discharged from the second mill, superheated steam which had been pressurized to 5 $kg/cm^2$ G by pumping was injected at the pressure of 7 $kg/cm^2$ G, and thus the slurry was heated to 140° C. The slurry was, after held for 40 seconds in a holding tube kept at 140° C., ejected through a pressure reducing valve into a flash chamber, which was kept at a reduced pressure of 450 torr., whereby it was cooled to 85° C. Then the slurry was continuously transferred to a centrifugal precipitator with horizontal axis, wherein the trituration residue was separated. The thus obtained bean milk was sterilized at 140° C. for 3 seconds by means of a flash sterilizer indirectly heated with a plate type heat exchanger, in the same way as in Example 15. Then the milk was cooled to 2° C. (This milk is hereinafter called Sample 9.)

COMPARATIVE EXAMPLE 7

For the purpose of comparison, bean slurry was obtained in the same way as in Example 16. The slurry was heated at 90° C. for 20 minutes and transferred to a centrifugal separator with horizontal axis and further treated as in Example 16. Thus bean milk was obtained. The yield of the solid ingredients of this milk (hereinafter called Sample 10) based on the skinless seeds was the same as that of Sample 9.

Sample 9 and 10 were stored in a refrigerator at 2° C. for a period of time as indicated in Table 5, and thereafter, organoleptic appraisal was conducted by the 10 panel members. The results are shown in Table 5.

TABLE 5

| | | Storage period (days) | | | |
|---|---|---|---|---|---|
| | | 1 | 3 | 7 | 14 |
| Sample 9 | Grassy smelling | – | – | – | – |
| | Bean smelling | + | + | + | + |
| Sample 10 | Grassy smelling | + | + + | + + + + | + + + + |
| | Bean smelling | + | + | + | + |

As being apparent from Table 5, bean milk of Sample 9 does not regenerate the grassy smelling.

EXAMPLE 17

Bean milk was obtained in the same way as in Example 16 except that the bean slurry was heat-treated at 125° C. for 2 minutes. The yield of the solid ingredients of the milk based on the weight of the beans was 66%. This milk was stored at 2° C. for 14 days, and organoleptic appraisal was conducted with respect to the odor of this milk as in Example 16. No grassy smelling was felt.

EXAMPLE 18

Bean milk was obtained in the same way as in Example 16 except that the bean slurry was heat-treated at 150° C. for 20 seconds. This milk was stored at 2° C. for 14 days, and organoleptic appraisal was conducted as in Example 16. No grassy smelling was felt.

What we claim is:

1. A method for extracting water-soluble components including proteins from soybeans, comprising:

triturating soybean seeds, which have not been soaked in water, in deoxygenated hot water of from 70° C. to the boiling point under anaerobic conditions and thus extracting said water-soluble components, said hot water being deoxygenated to the extent necessary to prevent the development of foul odors in the aqueous extract resulting from the trituration of the seeds and to enhance the rate of extraction of proteinaceous matter from said soybeans; and then separating the extracted water-soluble components which include proteins from the non-soluble residue remaining from the extraction process.

2. The method as set forth in claim 1, wherein said seeds are soybeans the skin of which has been removed.

3. The method as set forth in claim 1, wherein said trituration-extraction is carried out at a temperature between 75° C. and the boiling point.

4. The method as set forth in claim 1, wherein the trituration-extraction is carried out for several seconds to 60 minutes.

5. The method as set forth in claim 1, wherein the trituration is continuously carried out.

6. The method of claim 5, wherein the triturated material is held at a temperature sufficient to deactivate biochemically active substances in said material.

7. The method as set forth in claim 6, wherein the temperature at which the triturated material is held is 70°–190° C.

8. The method as set forth in claim 6, wherein the holding time is several seconds to 60 minutes.

9. The method as set forth in claim 6, wherein the holding temperature is 100°–190° C.

10. The method as set forth in claim 9, wherein the holding time is several seconds to several minutes.

11. The method of claim 6, wherein said biologically active substances are deactivated after the separation of trituration residues and extraction solution.

12. The method of claim 6, wherein said biologically active substances are deactivated and sterilization of the extraction solution are simultaneously conducted.

13. The method as set forth in claim 1, wherein the trituration is carried out by means of 2 or 3 trituration apparatuses connected in series.

14. The method as set forth in claim 13, wherein the last stage trituration apparatus is a colloid mill.

15. The method as set forth in claim 1, wherein a deodorization treatment is applied to the extraction solution.

16. The method as set forth in claim 15, wherein the deodorization is carried out simultaneously with flash cooling after the sterilization.

17. The method of claim 15, which further comprises: treating said aqueous extraction solution with at least one deodorizing agent.

18. The method as set forth in claim 1, wherein every stage of treatment and intermediate storage tanks annd carrier conduits are maintained under anaerobic conditions.

19. The method as set forth in claim 1, wherein every stage of treatment and intermediate storage tanks and carrier conduits are kept at a temperature not less than 50° C.

20. The method of claim 1, wherein the separated trituration residue is washed with water to recover the extraction solution and the diluted extraction solution is degased and/or preheated and used as the extraction water.

21. A process for extracting water-soluble components including proteins from soybeans, comprising:

triturating soybean seeds, which have not been soaked in water, in deoxygenated hot water of from 70° C. to the boiling point, said water containing at least one substance selected from the group consisting of metal ion chelating agents, cysteine, sodium hydroxide, potassium hydroxide, ammonium hydroxide and calcium hydroxide, under anaerobic conditions and thus extracting said water-soluble components, said hot water being deoxygenated to the extent necessary to prevent the development of foul odors in the aqueous extract resulting from the trituration of the seeds and to enhance the rate of extraction of proteinaceous matter from said soybeans; and then separating the extracted water-soluble components which include proteins from the non-soluble residue remaining from the extraction process.

22. The method as set forth in claim 21, wherein said metal ion chelating agent is polyphosphoric acid or potassium, sodium or ammonium salt thereof.

23. The method as set forth in claim 21, wherein 0.02–1.5% based on the weight of said seeds of said metal ion chelating agent is used.

* * * * *